United States Patent

[11] 3,589,192

| [72] | Inventor | Stephen W. Sabovik, deceased<br>late of Garfield Heights, Ohio (by Shirley J. Sabovik, executrix) |
|---|---|---|
| [21] | Appl. No. | 829,161 |
| [22] | Filed | May 27, 1969 |
| [45] | Patented | June 29, 1971 |
| [73] | Assignee | Alco Standard Corporation |

[54] ADJUSTABLE THERMOCOUPLE ASSEMBLY
12 Claims, 6 Drawing Figs.

[52] U.S. Cl............................................. 73/344,
73/359, 136/230
[51] Int. Cl..................................................... G01k 7/04,
G01k 13/02
[50] Field of Search........................................... 73/359,
344, 343, 346, 349, 362; 136/230

[56] References Cited
UNITED STATES PATENTS

| 3,531,993 | 10/1970 | Karn............................ | 73/343 R |
| 3,283,580 | 11/1966 | Nanigian..................... | 73/359 |
| 2,234,056 | 3/1941 | Moore.......................... | 73/343 |

FOREIGN PATENTS

| 852,782 | 11/1960 | Great Britain | |

*Primary Examiner*—Louis R. Prince
*Assistant Examiner*—Denis E. Corr
*Attorney*—Meyer, Tilberry and Body ABSTRACT: An elongated sheathed thermocouple is received in a bore in a mounting body member. Selective adjustment means is provided between the sheathed thermocouple and the body member to move the thermocouple axially relative to the body member so that the hot junction projects varying distances from the end of the body member. The assembly may be used to obtain temperature of melted plastic at varying depths in a flow conduit.

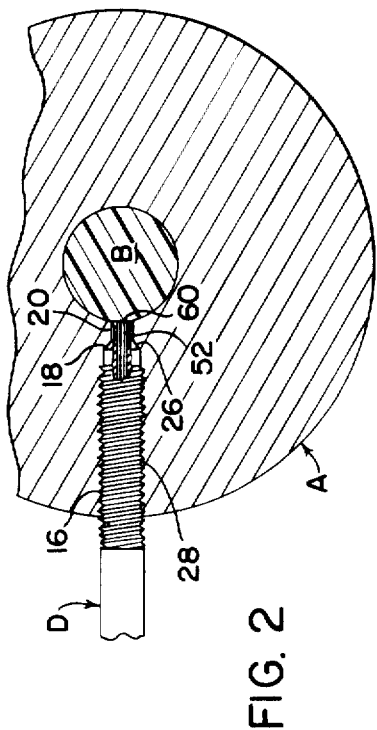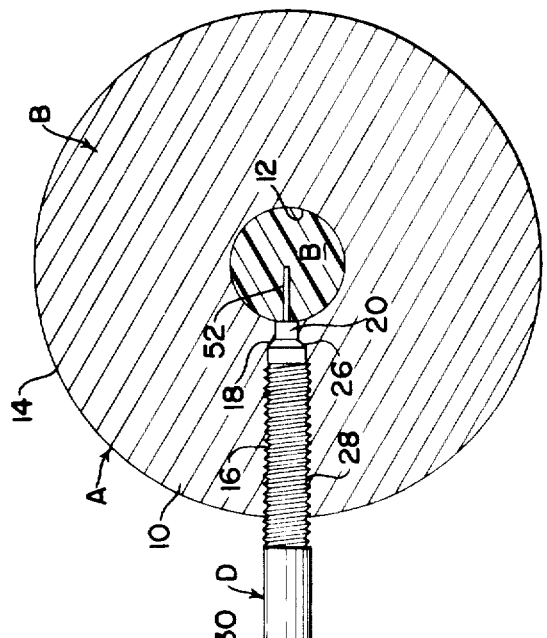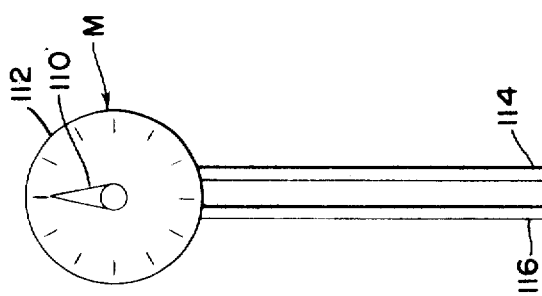

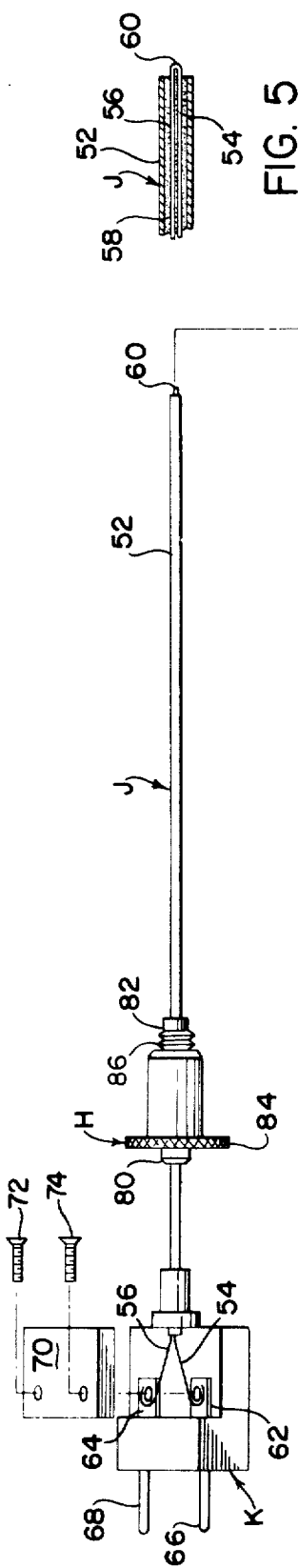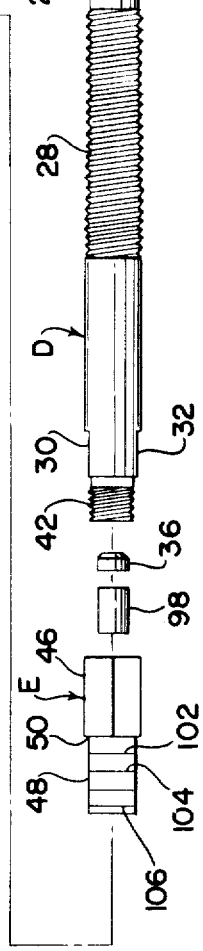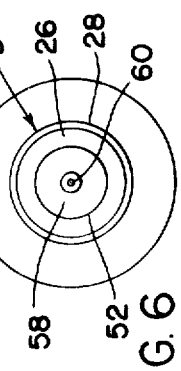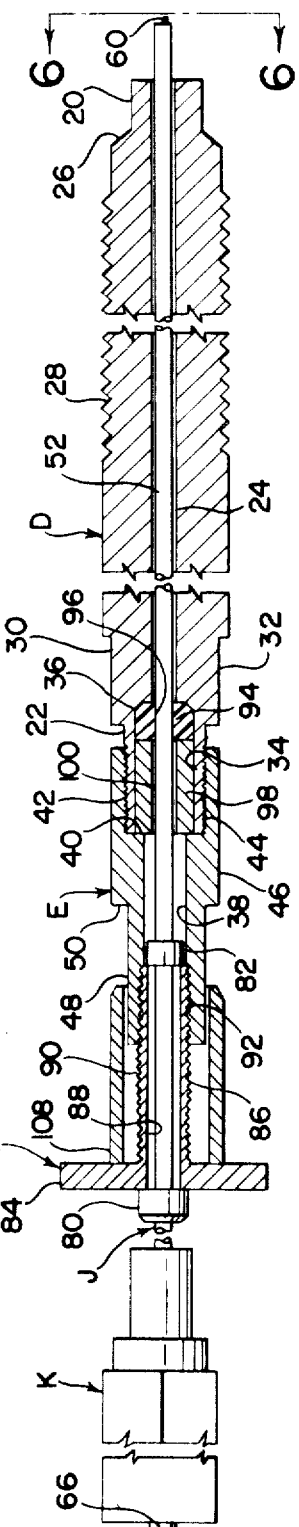

3,589,192

1

ADJUSTABLE THERMOCOUPLE ASSEMBLY

BACKGROUND OF THE INVENTION

This application pertains to the art of temperature measurement and more particularly to temperature measurement by the use of a thermocouple. The invention is particularly applicable to measuring the temperature of melted flowing plastic in a molding or extruding machine. More specifically, the invention relates to a thermocouple assembly including adjustment means for varying the depth of immersion of the hot junction in a flowing plastic stream. It will be appreciated that the invention has application to any situation where it is desirable to measure the temperature of a fluid at varying depths in a flow conduit.

In machinery for molding or extruding synthetic plastic material, it is desirable to measure the temperature of the flowing plastic as it moves from the barrel of the machine to the mold or die. An incorrect temperature setting can cause defect in the final article such as flow lines, discolorations, voids or brittleness. To prevent such defects, it is desirable to monitor the temperature of the flowing plastic so that the heaters can be adjusted to maintain an optimum temperature. To measure the temperature of the flowing plastic, it is common to provide an adapter between the barrel of the extruding or molding machine and the die or mold. The adapter may be cylindrical and provides a cylindrical flow conduit through which plastic flows to the die or mold. The adapter has a threaded hole through its wall for receiving a probe-type thermocouple. The thermocouple is elongated and has its hot junction projecting into the cylindrical flow conduit. The other end of the thermocouple may be connected to a measuring instrument such as a galvanometer. In prior arrangements, it was necessary to completely remove the thermocouple assembly and insert others having various probe depths in order to measure the temperature of the flowing plastic at varying depths in the cylindrical conduit. In addition, a thermocouple was normally left in the hole to serve as a plug when the machine was started up. If this is not done some other type of plug had to be inserted in the hole. When the machine is started up, the first plastic flowing through the conduit is normally only partially melted. This highly viscous and somewhat rigid material often tended to break off the probe of the thermocouple. Attempts to correct this have included capping the hot junction to reinforce it. This causes significant time lag in obtaining temperature readings. Even with a heavy cap the hot junction was often broken and it was then necessary to completely remove the thermocouple assembly and insert a new one. When the machine was then operating it was necessary to completely shut it down in order to change thermocouple assemblies to measure the flowing plastic at a different depth. Such a shut down is very uneconomical and upsets the balance of the entire machine. Once steady state operation of the machine is obtained the thermocouple assembly was normally left in the adapter. The probe within the flow conduit is a barrier which slows down the flow of plastic directly upstream behind it. Certain plastic materials degrade when they are kept at a high temperature for a long period of time. Plastic trapped upstream from the thermocouple probe would tend to degrade and slough off into the flowing stream to cause streaks and discolorations in the final product. Another solution to breaking of the probe of the thermocouple and degradation of plastic upstream of the probe has been to use a thermocouple which is flush with the inner wall of the flow conduit. This gives only a boundary layer temperature which is very inaccurate in judging the temperature at other depths. For example, the difference in maximum and minimum temperatures at different depths has been measured as high as 100° F and as low as 10° F. Also, measuring the temperature only at the boundary layer is subject to high variation because of a band electric heater around the barrel of the machine.

2

SUMMARY

In accordance with one aspect of the invention an adjustable thermocouple assembly includes a mounting or body member having an elongated hole therethrough. An elongated, sheathed thermocouple member is received through the hole in the body member for axial movement. An adjustment means cooperating with the body member and the thermocouple member is selectively operable to move the thermocouple member axially and vary the projecting distance of the hot junction from the body member. In one arrangement, the adjustment means comprises a knob rotatably secured to the thermocouple member in a fixed axial position. The knob is threadably engaged with means on the body member so that rotation of the knob moves the thermocouple member axially. Cooperating indicating means may be provided between the knob and the body member to indicate the position of the hot junction of the thermocouple member. In a preferred arrangement, an adapter member is positioned between the knob and the body member and compresses a gasket against the bottom of a recess in the body member and around a peripheral portion of the thermocouple member. With the adjustable thermocouple assembly of the present invention the hot junction of the thermocouple can be moved into or out of a flow conduit of a molding or extruding machine while the machine remains in operation. The hot junction of the thermocouple member may be withdrawn when the machine is started up so that breakage will not occur. This eliminates the need for a reinforcing cap over the hot junction and provides accurate temperature readings with no time lag. The present invention makes it possible to quickly and accurately measure a temperature at various depths in the flow conduit. Once the temperatures have been obtained the present invention makes it possible to retract the hot junction so that there is no interference with the flowing plastic and no degradation of plastic upstream from the hot junction. When the thermocouple is retracted, film is scrapped from the hot junction end so that no discoloration occurs in the plastic material.

It is a principal object of this invention to provide an adjustable thermocouple assembly for selectively measuring the temperature at various depths in a flow conduit.

It is a further object of this invention to provide such a thermocouple with an adjusting means which selectively positions the hot junction of the thermocouple at the desired depth.

It is another object of this invention to provide such a thermocouple with adjusting means which includes a knob rotatably attached to the thermocouple in a fixed axial position and having threads cooperating with threads on a mounting body member to adjust the axial position of the thermocouple.

It is an additional object of this invention to provide such a thermocouple and adjusting means with an adapter positioned between the mounting body member and the rotatable knob and with the adapter cooperating with a gasket to provide a seal around the thermocouple.

BRIEF DESCRIPTION OF THE DRAWING

The invention may take physical form in certain parts and arrangements of parts, a preferred embodiment of which will be described in detail in this specification and illustrated in the accompanying drawings.

FIG. 1 is a side elevational view showing the adjustable thermostat assembly of the present invention attached to a flow conduit and to a measuring instrument.

FIG. 2 is a partial side elevational cross-sectional view showing the thermocouple member in a retracted position relative to body member.

FIG. 3 is a side cross-sectional elevational view of the adjustable thermostat assembly of the present invention.

FIG. 4 is an exploded side elevational view of the adjustable thermostat assembly of the present invention.

FIG. 5 is a partial side elevational cross-sectional view of the thermocouple member for use with the adjustable thermostat assembly of the present invention.

FIG. 6 is an end elevational view taken on line 6—6 of FIG. 3.

DESCRIPTION OF THE PREFERRED EMBODIMENT

In accordance with the present invention a plastic molding or extruding machine includes a flow conduit or barrel for plastic material loading to a die or mold. While the barrel itself of the machine may be adapted for receiving a thermocouple for measuring the temperature of plastic flowing therethrough, it is conventional to provide an additional cylindrical flow conduit A between the barrel and the die or mold in a well-known manner. Cylinder A includes a peripheral wall member 10 having inner and outer cylindrical surfaces 12 and 14 respectively. Inner surface 12 provides a flow conduit for plastic material B. Synthetic plastic material B is melted in the machine and flows through the conduit under high pressure with impetus provided by a ram or screw in a well-known manner. Wall 10 of cylinder A has a hole 16 formed completely therethrough and extending radially from the longitudinal central axes of cylinder A. Hole 16 is necked down at its inner end before entering the flow conduit to provide a shoulder 18.

In one arrangement, the adjustable thermocouple assembly C of the present invention includes a mounting body member D, an adapter member E, a rotatable knob H, a thermocouple member J, and an electrical connector K. In a preferred arrangement, body member D has first and second ends 20 and 22 respectively, and an elongated cylindrical bore 24 extending longitudinally therethrough from one end to the other. Body member D has a reduced diameter at end 20 to provide a shoulder 26. Body member D is cylindrical and is also provided with exterior screw threads 28 as shown. Adjacent end 22, body member D is provided with flattened parallel portions 30 and 32 on which a wrench or the like may be applied to screw threads 28 into corresponding threads formed in hole 16 of cylinder A.

End 22 of body member D is formed with a cylindrical recess 34 symmetrical with respect to bore 24. The recess 34 includes a bottom 36 which slopes inwardly toward bore 24. Adapter E has a cylindrical hole 38 formed completely therethrough and an enlarged diameter portion at one end defines a shoulder 40. The enlarged diameter portion is provided with interior screw threads 42 for cooperation with exterior screw threads 44 on end 22 of body member D. Adapter E may have one end portion 46 of hexagonal exterior shape so that a wrench may be applied thereto for screwing adapter E onto end 22 of body member D. The other end 48 of adapter E may be cylindrical in its exterior cross-sectional shape and of smaller diameter than end portion 46 to provide a shoulder 50.

Thermocouple member J includes a hollow metal cylindrical sheath 52 within which a pair of spaced apart wires 54 and 56 of dissimilar material are insulatingly supported by a powdered material 58 such as magnesium oxide. Wires 54 and 56 may be of any suitable material such as chromel and alumel respectively. Wires 54 and 56 are joined together as by welding or the like at 60. It will be understood that many materials other than chrome and alumel could be used for wires 54 and 56 depending upon the application and operating temperatures. At the other end of sheath 52 of thermocouple J wires 54 and 56 exit and are connected with electrical connectors 62 and 64. Electrical connectors 62 and 64 connect with prongs 66 and 68 of plug K for connecting with a galvanometer or the like. Plug K may include a plate 70 held in place by screws 72 and 74 to hold wires 54 and 56 to electrical connectors 62 and 64.

Thermocouple J operates in a manner well known to those skilled in the art. Joined ends 60 of wires 54 and 56 form the hot junction of the thermocouple. End 60 is in contact with the melted plastic B while the other ends of wires 54 and 56 are at ambient temperature at plug K. The different materials for wires 54 and 56, and the difference in temperature at the two ends causes an electromotive force to exist in the circuit. The magnitude of the electromotive force, for any given pair of metals used in wires 54 and 56, depends upon the difference in temperature between the ends. The electromotive force produced may be read on a galvanometer or the like and this is converted into temperature from a voltage versus temperature chart.

Sheath 52 of thermocouple J includes a pair of spaced apart stops 80 and 82 suitably secured thereto as by welding. Knob H includes a circular gripping portion 84 and an axially extending cylindrical portion 86. A circular central hole 88 extends completely through axial portion 86 and gripping portion 84 of knob H. Knob H is received on sheath 52 of thermocouple J by passing sheath 52 through hole 88. Stops 80 and 82 may be secured to sheath 52 once knob H is in position or only one stop 80 may be secured to sheath 52 and knob H then applied before stop 82 is secured. Stops 80 and 82 hold knob H against axial movement relative to sheath 52 but permit rotational movement of knob H relative to sheath 52. Screw threads 90 are formed on the exterior of axial portion 86 of knob H to cooperate with internal screw threads 92 formed in hole 38 of adapter E.

A gasket 94 is received in recess 34 in body member D. Gasket 94 has a central circular opening 96 therein through which sheath 52 are received. Opening 96 is preferably slightly smaller in diameter than the exterior diameter of sheath 52 so that gasket 94 seals around sheath 52. Gasket 94 is preferably formed of a somewhat elastomeric material which is capable of withstanding high temperatures such as polytetrafluoroeoethylene. Gasket 94 is shaped to conform with sloping bottom 36 of recess 34. A cylindrical plug 98 has a central circular hole 100 therethrough and is received around sheath 52 in recess 34. Shoulder 40 on adapter E bears against the end of plug 98 to tightly seal gasket 94 against the bottom 36 of recess 34 and also compresses gasket 94 so that opening 96 tightly seals around sheath 52. Any melted plastic material entering between sheath 52 of thermocouple J and hole 24 of body member D is prevented from exiting by this sealing arrangement with gasket 94.

In one arrangement, end 48 of adapter E may include markings on the exterior thereof as at 102, 104 and 106. Knob H may include a cylindrical member 108 suitably secured to the face of gripping portion 84 as by welding or the like. Cylindrical member 108 extends freely over end portion 48 of adapter E. The end of cylindrical member 108 may be lined up with markings 102, 104 and 106 to accurately indicate the relative axial position of thermocouple J relative to body member D.

The thermocouple may be connected to a suitable measuring instrument M having a pointer 110 and an indicia plate 112. Measuring instrument M may be connected to plug K through wires 114 and 116 and a connector P. Meter M may be of many different types as is well known to those skilled in the art. For example, a simple type is a D'Arsonval-type galvanometer which is capable of measuring extremely small currents. Such a meter is well known and includes a stationary permanent magnet and a rotatably mounted movable coil. When current flows through the coil the resulting magnetic field reacts with the magnetic field of the permanent magnet and causes rotation of the coil. The coil may be connected with pointer 110 and the greater the amount of electrical current flow through the coil, the stronger the magnetic field produced and the greater the deflection of pointer 110. The movement of pointer 110 is read off on indicia plate 112. The reading is then compared with a previously prepared chart which indicates the temperature at which the thermocouple will produce that particular reading.

In operation of the device, all of the parts of thermocouple assembly C are assembled as shown in FIG. 3. Body member D is applied to cylinder A in FIG. 1 by screwing threads 28 into corresponding threads in hole 16 through wall 10. Shoulder 26 on body member D then sealingly engages against shoulder 18 in hole 16 of wall D. Flattened portions 30 and 32 of body member D may be used as gripping surfaces for a wrench or the like. Meter M is then suitably connected with plug K.

Gripping portion 84 of knob H is rotated counterclockwise which causes thread 90 on axial portion 86 to move outwardly away from adapter E due to cooperation with thread 92 on adapter E. The outer face of gripping portion 84 bears against stop 80 and moves thermocouple J to the left in FIGS. 1 and 3 so that hot junction 60 moves closer to end portion 20 of body member D. This may be continued until hot junction 60 is substantially flush with the inner surface 12 of wall D as shown in FIG. 2. The plastic molding or extruding machine may then be started up to cause plastic B to flow through the flow conduit. Hot junction end 60 of thermocouple J is out of the way of plastic B flowing in the flow conduit during start up so that rather rigid, unmelted plastic will not break off the hot junction. Once the machine has operated for a time and it is quite certain that no unmelted plastic is flowing through the flow conduit, knob H may be rotated clockwise. Rotation of gripping portion 84 of knob H clockwise causes the forward end of axial portion 86 of knob H to strike against stop 82 on sheath 52 of thermocouple J. Cooperation between threads 90 on axial portion 86 and interior thread 92 on end 48 of adapter E causes knob H to move to the right in FIGS. 1 and 3 toward body member D. Contact between the end of axial portion 86 and stop 82 also causes sheath 52 of thermocouple J to move to the right in FIGS. 1 and 3 relative to body member D. This causes hot junction 60 to be moved outwardly further away from end portion 20 of body member D and deeper into the flow conduit. Shoulder 50 on adapter E cooperates with the end portion of cylindrical member 108 on knob H to limit movement of knob H to a maximum position close to body member D. Once knob H has been rotated to a position in which hot junction 60 is at its desired projecting distance from end portion 20 of body member D, readings may be taken for a time on meter M. The uncapped hot junction 60 provides accurate readings very rapidly and there is substantially no time lag as there is with a capped junction. Once readings have been taken at a certain depth knob H may again be rotated clockwise or counterclockwise to position hot junction 60 at a different depth than the flow conduit and further readings taken on meter M. When all of the desirable readings are taken knob H may again be rotated counterclockwise to position hot junction 60 substantially flush with inner surface 12 of the flow conduit as shown in FIG. 2. When sheath 52 is retracted to the position shown in FIG. 2 plastic material is scraped off sheath 52 by contact with hole 24 in body member D. In the position of FIG. 2, there is no obstruction in the flowing plastic stream and discoloration of plastic which may normally be backed up behind the hot junction is eliminated. Cooperation between the end portion of cylindrical member 108 on knob H and markings 102, 104 and 106 on end portion 48 of adapter E may be used to accurately tell the position of hot junction 60 within the flow conduit. The indicia may be eliminated if so desired so that the position of hot junction 60 would simply be estimated. The maximum movement of hot junction 60 is preferably designed to reach the center of the flow conduit and retract flush with inner wall 12 as shown in FIG. 2. A greater or lesser degree of movement may be designed into the assembly if so desired. Those skilled in the art will readily be aware that the present invention eliminates many problems previously existent in obtaining accurate temperature readings of flowing plastic in an extruding or molding machine.

While the invention has been described with reference to the preferred embodiment, it is obvious that minor modifications and alterations will occur to others upon the reading and understanding of the specification.

It is claimed:

1. An adjustable thermocouple assembly comprising; an elongated body member having a longitudinal bore therethrough and a first end, an elongated thermocouple member received in said bore for axial movement relative to said body member, said thermocouple member having a hot junction end positioned adjacent said first end of said body member, knob means attached to said thermocouple member in a fixed axial position relative to said thermocouple member, and cooperating adjustment means for selectively moving said thermocouple member axially relative to said body member, said adjustment means including two elements, one of said elements being fixedly associated with said body member and the other of said elements being situated on said knob means, whereby rotation of said knob means positions said hot junction end at different distances from said first end of said body member outside of said bore.

2. The device of claim 1 wherein said knob means is rotatable relative to said thermocouple member.

3. The device of claim 2 wherein said cooperating adjustment means comprises screw threads.

4. The device of claim 1 wherein said body member has a second end and further including adapter means attached to said second end, said one element of said cooperating adjustment means being fixedly associated with said body member by said adapter means.

5. The device of claim 4 wherein said second end of said body member has an enlarged diameter recess therein, gasket means positioned in said recess, said adapter biasing against said gasket means and holding said gasket means in sealing engagement around said thermocouple member and against the bottom of said recess.

6. The device is claim 5 and further including a cylindrical plug positioned between said adapter and said gasket means around said thermocouple member.

7. The device of claim 4 wherein said adapter means has position indicating means formed on the exterior thereof and said knob means includes a cylindrical portion surrounding said position indicating means.

8. An adjustable thermocouple assembly comprising; and elongated body member having a longitudinal bore therethrough and first and second ends, an elongated thermocouple member received in said bore for axial movement relative to said body member, said thermocouple member having a hot junction end positioned adjacent said first end of said body member, said second end of said body member having an enlarged diameter recess therein, gasket means positioned in said recess around said thermocouple member, and adapter means attached to said second end of said body member and biasing against said gasket means and holding said gasket means in sealing engagement around said thermocouple member and against the bottom of said recess.

9. The device of claim 8 and further including cooperating adjustment means on said thermocouple member and said adapter means for selectively moving said thermocouple member axially relative to said body member to position said hot junction end at different distances from said first end of said body member outside of said bore.

10. The device of claim 9 wherein said cooperating adjustment means includes knob means rotatably attached to said thermocouple member in a fixed axial position relative to said thermocouple member, and interengaged screw threads on said knob means and said adapter means.

11. In a thermocouple member including an elongated cylindrical sheath having first and second end portions, a pair of wires of dissimilar material extending within said sheath, said wires being joined adjacent said first end portion of said sheath to define a hot junction end, insulating material in said sheath insulating said wires from said sheath, and a body member through which said sheath is slidably disposable the improvement comprising; knob means rotatably attached to said sheath between said first and second ends in a fixed axial position with respect to said sheath, said knob means having adjustment means thereon for cooperation with another adjustment means fixed with respect to said body member, said knob means including a gripping portion and a cylindrical portion extending from said gripping portion toward said hot junction end axially of said sheath, said cylindrical portion having screw threads formed thereon to define said adjustment means on said knob means, and said knob means including a cylindrical member extending from said gripping portion around said cylindrical portion in radially spaced relation to said cylindrical portion.

12. In a thermocouple member including an elongated cylindrical sheath having first and second end portions, a pair of wires of dissimilar material extending within said sheath, said wires being joined adjacent said first end portion of said sheath to define a hot junction end, insulating material in said sheath insulating said wires from said sheath, and a body member through which said sheath is slidably disposable the improvement comprising; knob means rotatably attached to said sheath between said first and second ends in a fixed axial position with respect to said sheath, said knob means having adjustment means thereon for cooperation with another adjustment means fixed with respect to said body member, said knob means including a gripping portion and a cylindrical portion extending from said gripping portion toward said hot junction end axially of said sheath, said cylindrical portion having screw threads formed thereon to define said adjustment means on said knob means, and said sheath having a pair of spaced-apart stops secured thereto, said knob means being positioned between said stops.